United States Patent
Giesa et al.

(10) Patent No.: US 7,932,837 B2
(45) Date of Patent: Apr. 26, 2011

(54) CONDITIONAL AIRCRAFT CABIN WARNING AND SIGNALLING SYSTEM FOR DETERMINING THE CABIN STATUS

(75) Inventors: Hans-Gerhard Giesa, Hamburg (DE); Fabian Zwirn, Hamburg (DE)

(73) Assignee: Airbus Deutschland GmbH (DE)

( * ) Notice: Subject to any disclaimer, the term of this patent is extended or adjusted under 35 U.S.C. 154(b) by 412 days.

(21) Appl. No.: 11/899,992

(22) Filed: Sep. 7, 2007

(65) Prior Publication Data
US 2008/0068220 A1 Mar. 20, 2008

Related U.S. Application Data

(60) Provisional application No. 60/843,085, filed on Sep. 8, 2006.

(30) Foreign Application Priority Data

Sep. 8, 2006 (DE) .......................... 10 2006 042 299

(51) Int. Cl.
*G08B 21/00* (2006.01)
(52) U.S. Cl. ..... 340/945; 340/457.1; 701/45; 244/122 R
(58) Field of Classification Search ................ 340/574, 340/945, 541, 573.1, 457.1; 280/735, 801.1; 180/277, 286, 287, 289, 268; 701/45; 244/122 R; 297/468, 477
See application file for complete search history.

(56) References Cited

U.S. PATENT DOCUMENTS

| | | | |
|---|---|---|---|
| 5,555,458 A | 9/1996 | Large | |
| 5,829,836 A | 11/1998 | Schumacher et al. | |
| 6,362,734 B1 | 3/2002 | McQuade et al. | |
| 6,448,907 B1 | 9/2002 | Naclerio | |
| 6,844,817 B2 * | 1/2005 | Gleine | 340/574 |
| 6,851,503 B2 * | 2/2005 | Almaraz et al. | 180/268 |
| 6,929,218 B1 | 8/2005 | Sanford et al. | |
| 7,209,033 B2 * | 4/2007 | Hofbeck et al. | 340/457.1 |
| 2003/0160497 A1 | 8/2003 | Darr | |
| 2005/0021602 A1 | 1/2005 | Noel et al. | |
| 2005/0080533 A1 | 4/2005 | Basir et al. | |
| 2006/0016330 A1 | 1/2006 | Zhu et al. | |
| 2006/0103193 A1 | 5/2006 | Kramer | |
| 2006/0163430 A1 | 7/2006 | Cordina et al. | |

FOREIGN PATENT DOCUMENTS

| | | |
|---|---|---|
| DE | 3242978 A1 | 5/1984 |
| DE | 296 13 291 | 11/1996 |
| DE | 19534024 | 3/1997 |

(Continued)

OTHER PUBLICATIONS

Charalambides, "Managing Severe Turbulence" Airbus: Safety First Magazine, 4 pages, Sep. 2005.

*Primary Examiner* — Anh V La
(74) *Attorney, Agent, or Firm* — Lerner, David, Littenberg, Krumholz & Mentlik, LLP

(57) ABSTRACT

A monitoring method for monitoring a seat status for an aircraft. A seat occupancy status of a seat element is measured by a seat occupancy sensor, and the fastening status of the seat element is measured by a fastening sensor. The seat occupancy status and the fasting status are transmitted to a monitoring device. The monitoring device automatically generates a warning signal if a combination of a predetermined occupancy status and a predetermined fastening status occurs.

19 Claims, 3 Drawing Sheets

FOREIGN PATENT DOCUMENTS

| | | |
|---|---|---|
| DE | 19606790 | 8/1997 |
| DE | 19743313 C1 | 12/1998 |
| DE | 19961874 C1 | 7/2001 |
| DE | 102 03 139 | 8/2002 |
| DE | 10161898 A1 | 4/2003 |
| DE | 10164068 A1 | 4/2003 |
| DE | 10228419 B3 | 3/2004 |
| DE | 10341578 A1 | 4/2005 |
| DE | 102004025319 | 12/2005 |
| DE | 102004037674 A1 | 2/2006 |
| EP | 1019263 A1 | 7/2000 |
| EP | 1623923 A1 | 2/2006 |
| FR | 2835675 A1 | 8/2003 |
| WO | 9916637 A1 | 4/1999 |
| WO | 03067818 A1 | 8/2003 |
| WO | 2005030523 A1 | 4/2005 |

\* cited by examiner

CONDITIONAL AIRCRAFT CABIN WARNING AND SIGNALLING SYSTEM FOR DETERMINING THE CABIN STATUS

CROSS-REFERENCE TO RELATED APPLICATIONS

This application claims the benefit of the filing date of U.S. Provisional Patent Application No. 60/843,085 filed Sep. 8, 2006, the disclosure of which is hereby incorporated herein by reference.

BACKGROUND OF THE INVENTION

The present invention pertains to a monitoring method and a monitoring system for monitoring a seat status, particularly a seat belt status and a seat occupancy status in an aircraft, to an aircraft with a monitoring system for monitoring a seat status and to a utilization of a monitoring system for monitoring a seat status in an aircraft.

During certain phases of a flight, for example, while taxiing on the ground, during take-off and landing phases or in other situations that arise while cruising, all passengers must take their seat and fasten their safety belt. The passengers are usually instructed to do so by means of illuminated fastening signs that remain illuminated until the hazardous situation is over. In such instances, the cabin attendants need to ensure that all passengers have fastened their safety belts. For this purpose, the cabin attendants carry out a visual inspection in order to check if the safety belts of the passengers are actually fastened, wherein the cabin attendants instruct the passengers to fasten their safety belts and, if so required, assist passengers in fastening their safety belts.

DE 10 2004 025 319 A1 discloses a seat status display system for passenger compartments in aircraft and vehicles, as well as a seat for passengers in aircraft and vehicles and a control and display unit. This publication discloses a seat status display system that can be used for passenger compartments in aircraft. In this case, a seat is addressed and the seat status is indicated on a display. The display may indicate the occupancy or vacancy of the seat, as well as the status of the seat belt, for example, whether the seat belt is fastened or not.

U.S. Pat. No. 5,555,458 discloses a display system, in which the belt status of all passengers is indicated for the cabin attendants on a central display panel. In addition to the belt status, the status of the folding tray table and the back rest are indicated. The same seat-specific information is individually indicated for the passengers on each passenger seat.

US 2006/0163430 discloses an analytical data processing and graphic display system that senses and indicates on a display functions of the allocation of luggage to the respective passengers, as well as the analysis of time parameters of movements and occupancies of passenger seats.

DE 10 203 139 discloses a method and a device for monitoring the use of a rear seat belt. The fastened safety belts are measured at a base time and a seat occupancy is derived thereof. An alarm is triggered if the number of fastened safety belts subsequently changes. Seat occupancy sensors are not used in this case.

DE 19606790 and DE 29613291 disclosed belt sensors in aircraft that are able to measure a fastening status of an aircraft seat. The fastening status is indicated on a central display.

SUMMARY OF THE INVENTION

There may be a need of supporting the observation of the passenger safety regulations.

The need may be attained with a monitoring method and a monitoring system for monitoring a seat status for an aircraft, with an aircraft and with the utilization of a monitoring system for monitoring a seat status in an aircraft with the characteristics according to the independent claims.

According to one exemplary embodiment, a monitoring method for monitoring a seat status for an aircraft is made available. A seat occupancy status of a seat element is measured by means of a seat occupancy sensor and the fastening status of the seat element, particularly of a seat belt of the seat element, is measured by means of a fastening sensor. The seat occupancy status and the fastening status are transmitted to a monitoring device. The monitoring device automatically generates a warning signal if a combination of a predetermined occupancy status and a predetermined fastening status of the seat element occurs.

According to another exemplary embodiment, a monitoring system for monitoring a seat status for an aircraft is made available. The monitoring system features a monitoring device and a seat element with a seat occupancy sensor and a fastening sensor. The seat occupancy sensor is designed for measuring the seat occupancy status of the seat element, and the fastening sensor is designed for measuring a fastening status of the seat element. The seat occupancy status and the fastening status can be transmitted to the monitoring device, wherein the monitoring device is designed for automatically generating a warning signal if a combination of a predetermined occupancy status and a predetermined fastening status occurs.

According to another exemplary embodiment, an aircraft with a monitoring system for monitoring a seat status is made available.

According to another exemplary embodiment, a monitoring system for monitoring a seat status is utilized in an aircraft.

The term "automatically generate" means that the monitoring device activates a warning signal without manual intervention, i.e., without requiring an operation by a person, if certain predetermined statuses of the seat occupancy and the fastening status occur.

The term predetermined seat occupancy status refers, for example, to a seat that is occupied by a person, a seat that is occupied by an object or a vacant seat. The term fastening status refers to the status of a safety device of a seat, for example, a belt system. The fastening status may indicate, for example, a non-fastened state or a fastened state of the belt system. In a non-fastened state, for example, a belt buckle and a belt lock are separated from one another, wherein the belt buckles and the belt locks are engaged in a fastened state.

Based on predetermined seat occupancy statuses, fastening statuses or combinations of fastening statuses and seat occupancy statuses of the seat element, the monitoring device is able to generate different warning signals. The monitoring device may generate a warning signal, for example, if a seat is occupied and a safety belt is not fastened, wherein no warning signal is generated if the seat is occupied and the safety belt is in the fastened state. This makes it possible, for example, to instruct a passenger to activate his safety belt by means of the warning signal, wherein the warning signal is terminated once the safety belt is fastened. It is furthermore possible to deactivate the warning signal for a vacant seat, on which no person is seated. For example, if a passenger unfastens his safety belt and leaves his seat, a warning signal can be deactivated because the passenger is no longer located in the vicinity of his seat element and therefore would be unable to perceive the warning signal.

Until now, the passengers are only instructed to fasten their safety belts by means of an information signal in hazardous situations. The information signal remains constantly illuminated until the hazardous situation is over without actively informing the passenger of his current fastening status. In the monitoring method and the monitoring device for monitoring a seat status, the monitoring device determines a seat occupancy status and a fastening status and safety precautions or warning signals are autonomously or automatically generated as a result thereof. This means that a cabin attendant no longer has to manually compare the seat occupancy statuses and the fastening statuses and to manually generate a warning signal as a result thereof, but rather is able to move into a safe position or perform other activities. This actively supports the cabin attendants in realizing a desired cabin safety status. Due to the combination of the fastening status and the occupancy status, passengers with non-fastened safety belts can be selectively instructed to fasten their safety belts by means of the warning signals. This purposefully focuses the attention on passengers with non-fastened safety belts and not on vacant seats or seats, on which the passenger safety belts are already fastened. The time required for safety controls by the cabin attendants consequently can be reduced. This also makes it possible, for example, to eliminate the visual inspection of the passenger belt statuses by the cabin attendants. In case all passenger safety belts are fastened, the cabin attendants can immediately secure themselves on their seats. Passengers with non-fastened seat belts can be immediately detected from any location in the cabin and directly addressed. The time required for the safety checks can be reduced with these measures.

According to another exemplary embodiment, the seat occupancy status and the fastening status are continuously measured such that the monitoring device detects a change in the seat occupancy status and the fastening status. This not only makes it possible to generate a warning signal once, but also to activate a warning signal at any time due to the continuous monitoring of the seat occupancy status and the fastening status. Since a cabin attendant cannot permanently compare the seat occupancy statuses and the fastening statuses, it may require some time until a passenger is instructed to fastened his safety belt. Due to a the permanent monitoring of the seat statuses by means of the monitoring device, a passenger is immediately instructed to fastened his safety belt by means of a warning signal.

According to another exemplary embodiment, the monitoring device is manually activated. This makes it possible, for example, for the cabin attendants to switch on the monitoring device such that the seat statuses are only monitored in certain situations. The monitoring device may furthermore be coupled to the fastening information system such that the manual activation of the fastening information system also results in the activation of the monitoring device.

According to another exemplary embodiment, the monitoring device is automatically activated. In suddenly occurring hazardous situations, this makes it possible to instruct all passengers to fasten their safety belts by means of the warning signals such that the cabin attendants can move to a safe location. Consequently, the cabin attendants no longer have to instruct all passengers to fasten their safety belts, but rather can use this time to secure themselves.

According to another exemplary embodiment, the monitoring device is automatically activated by predetermined flight status data. The monitoring device may receive flight data or avionics data from the on-board network or the on-board computer and analyze a hazardous situation based on this data. If a hazardous situation arises, for example, an announcement of turbulences, the monitoring device is automatically activated such that warning signals are transmitted in order to instruct the passengers to fasten their safety belts. The automatic control of the monitoring device makes it impossible to forget the activation of the warning signals. Flight status data may consist, for example, of data on an altitude change of the aircraft, weather radar data, wind data, data for detecting turbulences or flight phase-specific times.

According to another exemplary embodiment, the monitoring device is automatically activated at predetermined parameters. In this case, the parameters may be selected from the group consisting of duration of a seat status, number of non-fastened safety belts, toilet occupancy and number of unoccupied booked seats. The duration of a seat status may refer to the time that elapses between the activation of the monitoring device and a change in the fastening status or the occupancy status. For example, if a monitoring device is activated while the passengers are instructed to fasten their safety belts and the passenger does not fastenen the safety belt of his seat within a predetermined time, the monitoring device automatically transmits a warning signal. The monitoring device may furthermore activate a warning signal if a certain number of safety belts are not fastened. It is also possible to determine the number of vacant booked seats such that the monitoring device is activated if a certain number of passengers are not secured. This makes it possible to prevent an excessive number of passengers from moving about the aircraft.

According to another exemplary embodiment, the warning signal is transmitted to a central indicating unit, wherein the warning signal is output by means of the central indicating unit. The term indicating unit refers, for example, to loudspeakers for outputting audio or voice signals as well as to electronic display panels or monitors for illustrating images and symbols. A central indicating unit may be arranged at a central location in the aircraft such that the cabin attendants are able to perceive the warning about a certain safety status of an aircraft passenger centrally, i.e., at a certain position. This central indicating unit not only permanently indicates a seat occupancy status and a fastening status, but also activates a warning signal by means of the monitoring device based on a comparison between the fastening status data and the seat occupancy data. This means that a cabin attendant does not have to permanently compare the occupancy data and the fastening status data, but rather is automatically informed of a hazardous situation by means of the warning signal that is automatically activated based on the comparison of the data. Consequently, a cabin attendant is able to instruct an individual aircraft passenger to activate the seat safety systems. The warning signal makes it impossible to overlook any change in the occupancy statuses or the seat statuses of an aircraft seat because they are immediately indicated by means of the warning system.

According to another exemplary embodiment, a position of the seat element is determined such that the position of the seat element can be indicated on the central indicating unit. The central indicating unit enables the cabin attendants to immediately identify the location or, for example, the row and the seat number of the seat element, in which the safety devices are not activated, without having to start a time-consuming search. The seat elements may be identifiable, for example, by means of transponders or ID chips.

According to another exemplary embodiment, the warning signal is transmitted to a local indicating unit by means of the monitoring device. The warning signal is output by means of the local indicating unit. The local indicating unit is arranged within the range of perception of a passenger. The term range of perception refers to the surroundings of a passenger, in which the passengers is able to perceive the warning signals. If audio signals are output, this means that the indicating unit or the loudspeaker needs to be arranged within the range of audibility of the passenger. If the warning signals consist of images, the local indicating unit needs to be arranged within the range of visibility of the passenger such that the passenger is able to recognize the warning signals. The range of perception therefore may lie, for example, in a region of the back rest of the front seat, the floor, a ceiling element or the seat element itself. The indication of the warning signals on the local indicating unit makes it possible to immediately and unequivocably inform the passenger about the safety precautions of the aircraft seat and to instruct this passenger to activate these safety precautions. An individual notification of the passenger by the cabin attendants is not required such that the cabin attendants can remain in a secured position or use this time to perform other activities. The warning signals can furthermore be locally and selectively indicated on this local indicating unit. Consequently, the cabin attendants are able to identify the passengers who are not secured by a fastened seat belt despite conditional instructions to do so from any location of the passenger area.

Thus, the local indicating unit may be adapted for warning the unfastened passenger as well as the flight attendant more efficiently. If the local indicating unit consist of a local loudspeaker for generating local acoustic warning signals, for instance, the flight attendant may be able to localize the unsafe passenger quickly. On the other side, a centralized chime may be provided, that indicates to the flight attendant a non-secured passenger. The localisation may then be provided by centralized or local warning signals. Thus, the flight attendant receives immediately and quickly the information of an unsafe passenger as well as his location, without having to check the location of the unsafe passenger on a central indicating unit.

Further on, the local indicating unit may be part of the in-flight entertainment system (IFE), that is locally installed in front of the passengers. Thus, in case that a passenger has not fastened his seat-belt, the entertainment program will interrupt and a warning signal will be shown at the monitor of the in-flight entertainment system, so that the attention of the passenger will be drawn to his fastening status of the seat.

Moreover, the local indicating units may be installed for each seat row. Thus, the flight attendant may quickly receive the information of all passengers when passing the seat row. The local indicating units of a the seat row may consist of small displays, such as plasma or other flat screen panels.

According to another exemplary embodiment, the warning signal is transmitted to a decentralized indicating unit by means of the monitoring device. The warning signal is indicated by means of the decentralized indicating unit, wherein the decentralized indicating unit is assigned to the seat element. The decentralized indicating unit indicates the seat elements, the safety belts of which are in the non-fastened state, to a cabin attendant such that the cabin attendant is able to specifically ask the passengers situated in the seat element to change the fastening state. Passengers who are not secured by fastened safety belts can be selectively indicated to the cabin attendants in the aircraft cabin by means of the decentralized, local indicating unit.

According to another exemplary embodiment, the seat occupancy status and the fastening status are stored in a storage element. In another exemplary embodiment, passenger data is provided in the storage element and the seat occupancy status and the fastening status are compared with the passenger data. This makes it possible to realize an arbitrary availability and utilization of information. This information can be evaluated in a centralized or decentralized fashion inside or outside the aircraft. The term passenger data refers, for example, to the name and the seat position. This makes it possible to determine at all times when a passenger has occupied his seat and activated the safety belt. Important information that can be used in case of liability claims against the airlines or claims for damages can be obtained in this fashion. In addition, the customary counting routine after the passengers have boarded the aircraft and taken their seats can be eliminated because the seat elements occupied by passengers can be compared with passengers who booked a flight and registered at the gate access. The time required for the boarding phase therefore can be reduced because the manual counting by the cabin attendants can be eliminated.

According to another exemplary embodiment, the seat occupancy status and the fastening status of a multitude of aircraft seats are made available to the monitoring unit. This enables the monitoring unit to monitor a multitude of aircraft seats and, for example, to monitor the complete aircraft cabin of an aircraft.

According to another exemplary embodiment, the monitoring device is activated for a predetermined number of seat elements selected from the multitude of seat elements. For example, this enables the monitoring unit to monitor different regions of seat elements. Consequently, regions with certain groups of persons, for example, children who are traveling alone, can be permanently and automatically monitored such the cabin attendants do not have to constantly focus their attention on these regions. If individual passengers should be permanently secured by a fastened seat belt, it is possible to only monitor these specific seat elements by means of the monitoring unit.

According to another exemplary embodiment, the warning signals are selected from the group consisting of audio signals, illumination signals, vibration signals, video signals and recorded voice signals.

According to another exemplary embodiment, at least one of the seat occupancy statuses, the fastening statuses or the warning signals is transmitted by means of wireless transmission techniques. This makes it possible, for example, to transmit the seat occupancy statuses and fastening statuses of the seat element to the monitoring device in a wireless fashion without requiring restrictive cable connections.

According to another exemplary embodiment, the fastening sensor is integrated into the belt lock of the safety belt of the seat element, wherein the fastening sensor features one or more Hall sensors. The Hall sensors measure the fastening status such that the engagement between the belt lock and the belt buckle of the seat element is detected.

According to another exemplary embodiment, the fastening status is transmitted to the monitoring device by means of a conductor that is woven into the belt band, wherein the belt band connects the belt lock and the seat buckle to the seat element. Due to the weaving of a conductor into the belt band that connects the belt lock and the seat buckle to the seat element, the conductor is protected from damages. Consequently, the frequency of a defect of the conductor is reduced.

According to another exemplary embodiment, the seat occupancy sensor is arranged in the seat cushion of the seat element. A weight of an object situated on the seat cushion is measured such that a seat occupancy status is determined. The weight measurement makes it possible to determine if a passenger or an object is situated on the seat element. A false alarm therefore can be prevented.

According to another exemplary embodiment, the seat occupancy sensor is arranged in the seat cushion of the seat element, wherein a seat impression of an object situated on the seat cushion is measured such that the seat occupancy status is determined. The measurement of a seat impression makes it possible to specifically determine if a person or any other object is situated on the seat element. Persons have a specific seat impression that can usually be distinguished from the seat impression of an object. This makes it possible to prevent false alarms as well as unnecessary warning signals, for example, for a vacant seat.

The embodiments of the monitoring method also apply to the monitoring system, to the aircraft as well as to the utilization and vice versa.

The permanent information signals used so far for instructing passengers to fasten their seat belts are supplemented with the warning signals such that the passenger is actively instructed to fasten his safety belt. The warning signals may feature indicating sounds, voice messages, light signals, video signals or vibrations. Furthermore, the passengers are asked to fasten their safety belts and the cabin attendants are also informed of a certain seat status. The cabin attendants therefore are actively supported in realizing the desired cabin status. In addition, an automatic activation of record, stored announcements for the passengers can be realized if a certain cabin status is not achieved in accordance with defined parameters (e.g., time, the number of non-fastened safety belts, toilet occupancy, vacant booked seats). Due to the utilization of seat sensors that are able to distinguish whether a seat is occupied by a passenger or a different type of object, only seats that are occupied by a passenger are asked to fasten the safety belts or selectively indicate passengers with non-fastened safety belts. This specifically focuses the attention on passengers who are not secured by fastened seat belts and not on seats that are not occupied by a passenger and on which the belt lock consequently does not have to be engaged. The warning signals can furthermore be indicated locally and selectively by means of already existing indicating devices. This enables the cabin attendants to identify the passengers, whose seat belts are not fastened despite instructions to the so, from any location of the passenger area. Another central indicating device that is activated when the seat belt of at least one passenger is not fastened is provided as an alarm device in the vicinity of the cabin attendant stations. The visual inspection of the passenger seat belt statuses can also be eliminated. The monitoring device may furthermore be integrated into a central cabin network such that no separate network is required.

BRIEF DESCRIPTION OF THE DRAWINGS

In order to further explain and better comprehend the present invention, embodiments are described in greater detail below with reference to the enclosed figures. The figures show.

DETAILED DESCRIPTION

Identical or similar components are identified by the same reference symbols in different figures. The figures show schematic illustrations that are not drawn true-to-scale.

Figure 1:
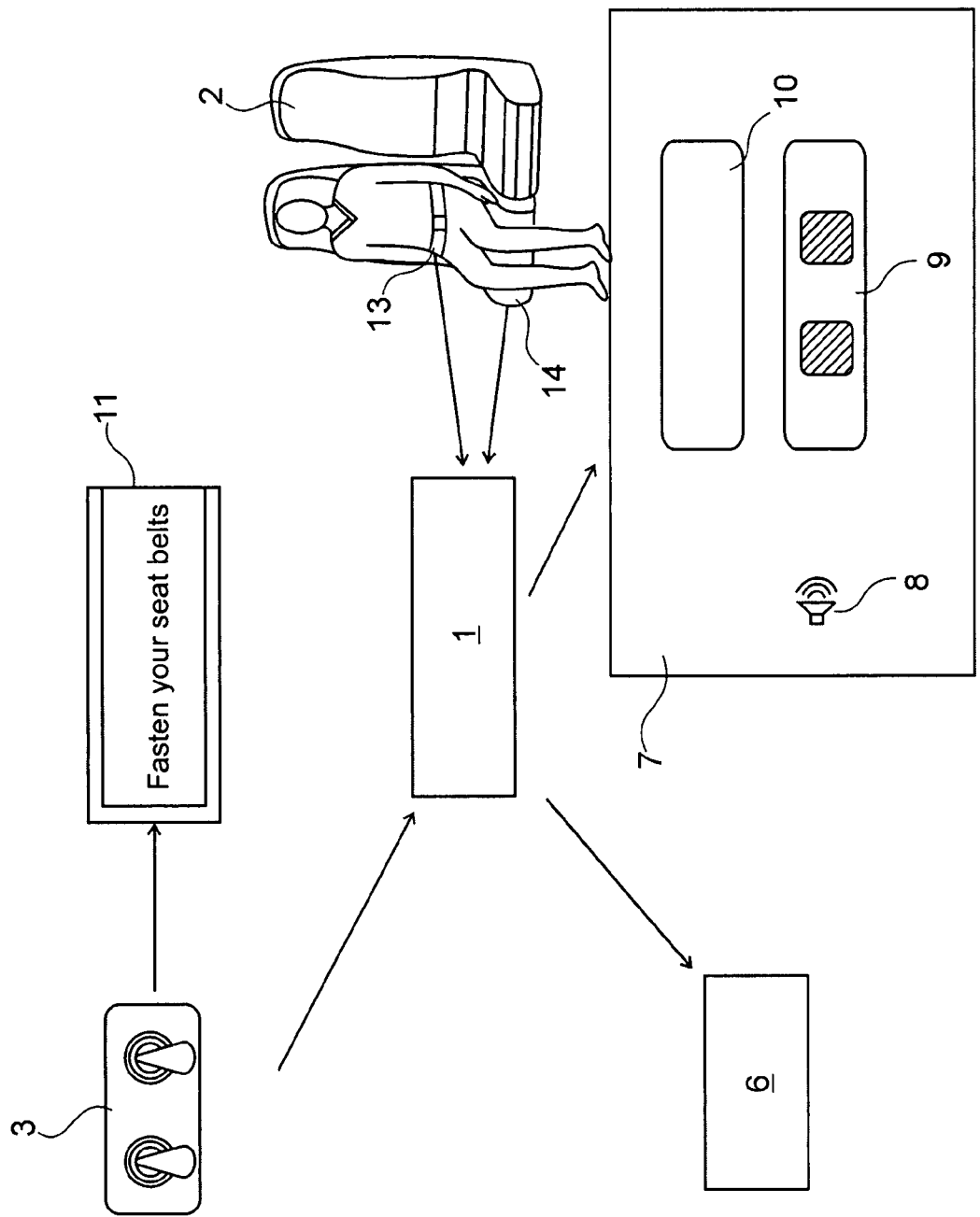
FIG. 1, a schematic illustration of an exemplary embodiment of the inventive monitoring system.

FIG. 1 shows an exemplary embodiment of the monitoring system for monitoring a seat status for an aircraft. A seat occupancy sensor 14 of a seat element 2 measures a seat occupancy status and a fastening sensor 13 measures a fastening status of the seat element 2. The seat occupancy status and the fastening status are transmitted to a monitoring device 1. The monitoring device 1 can automatically control a warning signal and activate the warning signal, for example, at a predetermined seat occupancy status and a predetermined fastening status of the seat element 2. If a passenger is situated in the seat element, the seat occupancy status is set, for example, to "occupied." For example, if the seat belt of the passenger is fastened, the fastening status is set to "secured." If the monitoring device 1 detects, for example, that the fastening sensor 13 signals a non-fastened belt based on the fastening status, the monitoring device 1 automatically activates a warning signal. In this case, the activation of the warning signal no longer needs to be carried out by the cabin attendants.

FIG. 1 furthermore shows an activation unit 3 for manually activating belt fastening instructions 11, as well as the monitoring device 1. The monitoring device 1 therefore can be activated depending on the hazardous situation. A manual switching function of the monitoring device 1 also makes it possible to deactivate the monitoring device such that no unnecessary warning signals are transmitted.

FIG. 1 furthermore shows that the monitoring device 1 can control a central indicating unit 6 or a local indicating unit 7. The central indicating units 6 and the local indicating unit 7 may indicate different warning signals. For example, it is possible to choose audio signals 8 that consist, for example, of pure tones (sinus tones) or even of recorded voice signals 8, illumination signals 9 or video signals 10.

Figure 2:
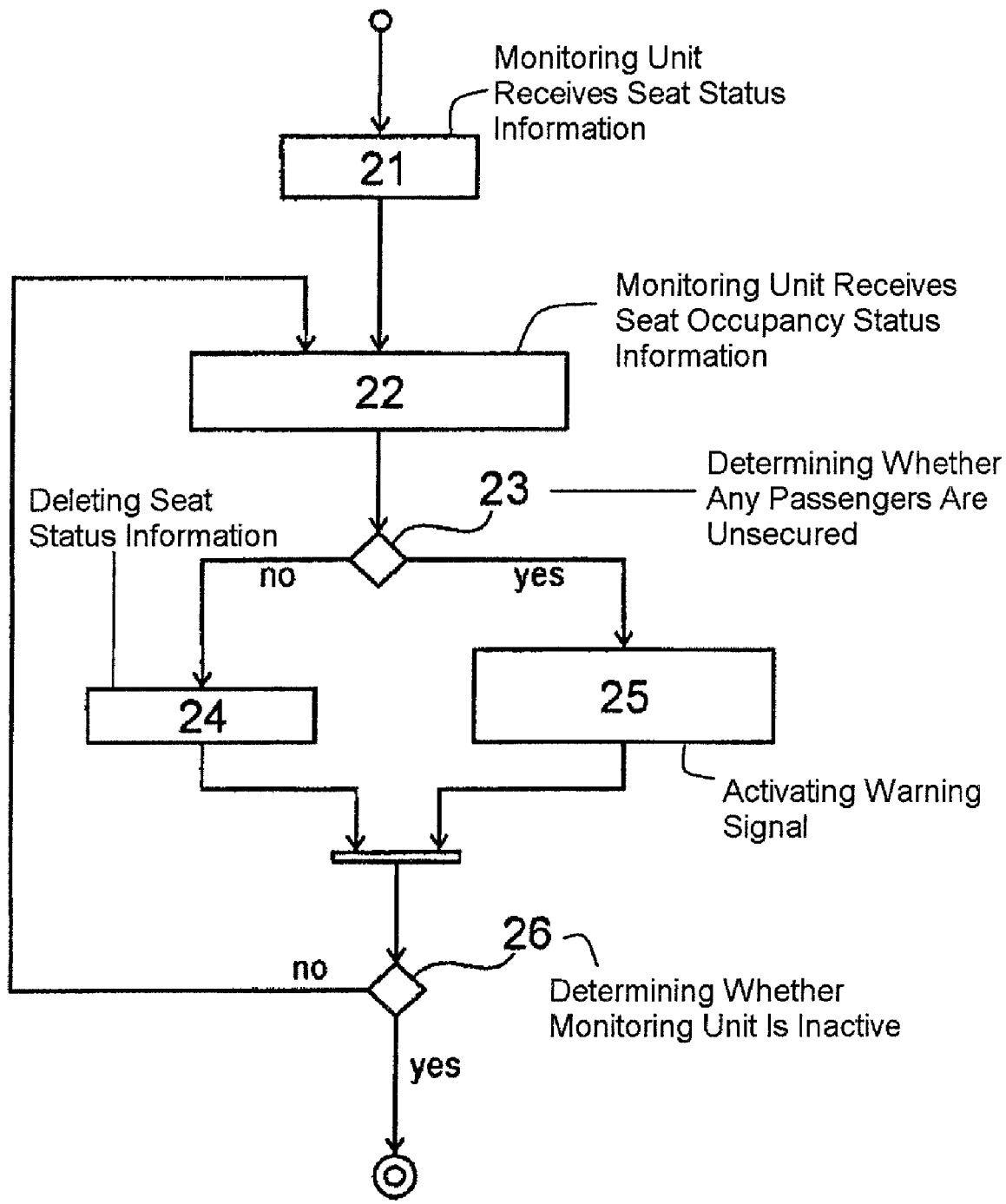
FIG. 2, a flowchart of an exemplary embodiment of the monitoring method.

FIG. 2 shows a schematic flowchart of the monitoring method for monitoring a seat status. The monitoring unit 1 is initially activated automatically or manually (step 21). The monitoring unit (step 21) receives the seat status information that may contain the fastening status as well as the seat occupancy status of a seat element 2 (step 22). Based on the seat status data, the monitoring device 1 recognizes if a seat is occupied by a person and a safety belt 2 is not activated (step 23). If all persons are secured in their seat elements 2, the seat status data is deleted (step 24) and another measurement is carried out if the monitoring system is still active (step 26). In case a few passengers are not secured in their seat elements 2 by fastened seat belts (step 23), the monitoring unit 1 activates warning signals (step 25). In steps 24 and 25, the seat status data measured at the time, for example, the fastening status or the seat occupancy status, may be stored and subsequently evaluated. If the monitoring device 1 is still active (step 26), the seat occupancy status and the fastening status of a seat element 2 are measured anew. If a passenger fastens a seat belt, the fastening status changes such that the monitoring unit 1 decides to activate no warning signals in step 23. This check of the monitoring device 1 takes place in a cyclic fashion until the monitoring device is deactivated in step 21.

In this case, the monitoring device 1 may be controlled manually or automatically based on flight data or other predetermined data.

Figure 3:
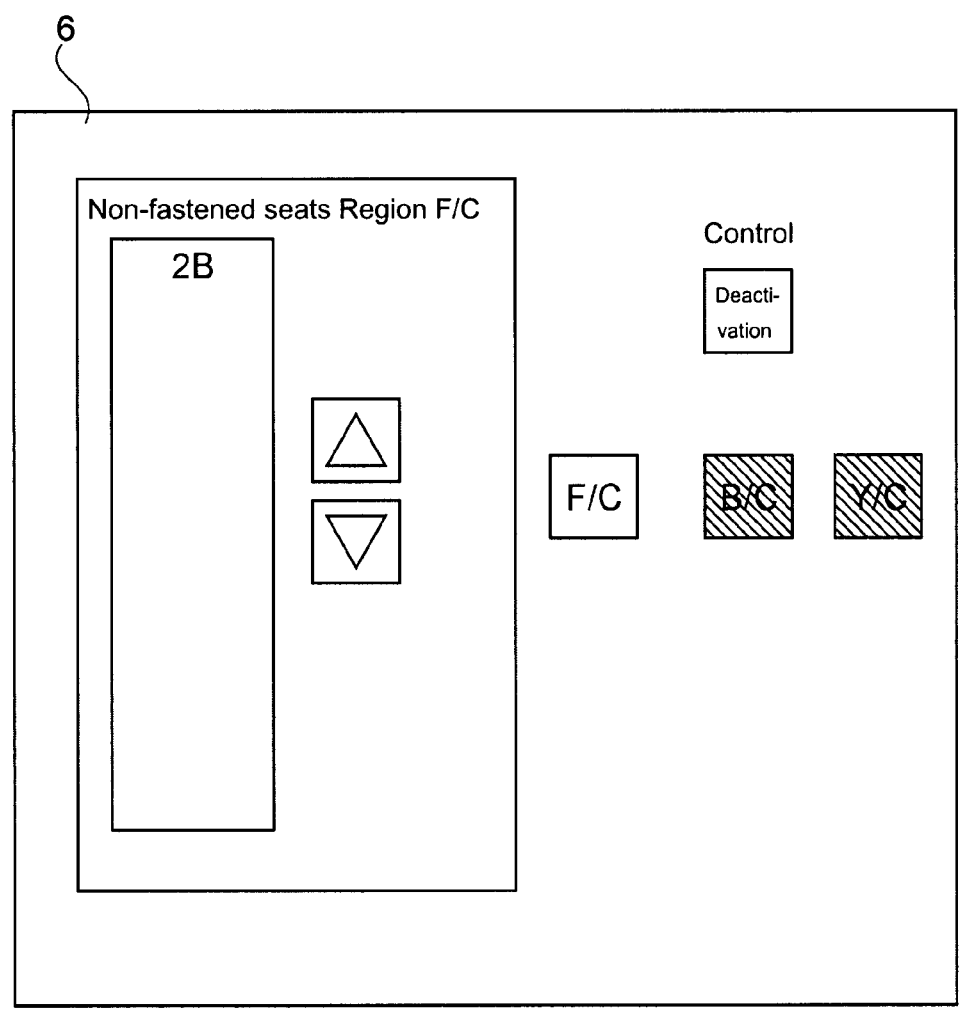
FIG. 3, a schematic illustration of a central indicating unit according to one exemplary embodiment of the invention.

FIG. 3 shows an exemplary illustration of a central indicating unit 6, on which an overview of the seat statuses of individual seat elements 2 can also be indicated.

Figure 4:
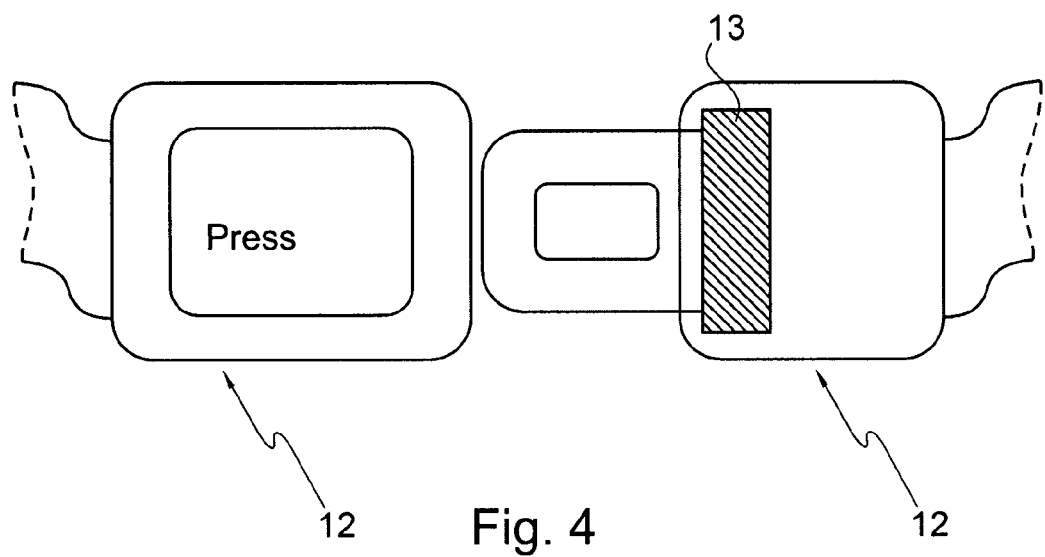
FIG. 4, an illustration of a belt lock with a fastening sensor according to one exemplary embodiment of the invention.

FIG. 4 shows an exemplary embodiment of a belt lock 12 that features a belt sensor 13. The belt sensor 13 consists, for example, of a Hall sensor that is able to measure changes in magnetic fields. If the belt buckle is engaged with the belt lock 12, the magnetic field changes such that the Hall sensor 13 can detect a change of the fastening status.

For example, the shape of a seat imprint can be measured in order to determine an occupancy status of a seat element 2 with a seat cushion, in which a seat occupancy sensor 14 is arranged. Persons have specific seat occupancy shapes. These seat imprints of a person are shaped differently than those of a suitcase or a purse. In addition to determining the seat occupancy shape, the seat occupancy sensor 14 can also measure the weight of an object situated on the seat cushion.

It should also be noted that "comprising" does not exclude any other elements or steps and that "a" or "an" does not exclude a multitude. It should furthermore be noted that characteristics or steps that were described with reference to one of the above embodiments can also be used in combination with other characteristics or steps of other above-described embodiments. The reference symbols in the claims should not be interpreted in a restrictive sense.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for monitoring seat status for an aircraft, wherein the method comprises:
    measuring a seat occupancy status of a seat element by a seat occupancy sensor;
    measuring a fastening status of the seat element by a fastening sensor;
    transmitting the seat occupancy status and the fastening status to a monitoring device; and
    automatically generating a warning signal by the monitoring device if a combination of a predetermined occupancy status and a predetermined fastening status occurs; and
    wherein the monitoring device is activated automatically at predetermined flight status data;
    wherein the flight status data is selected from the group consisting of data on an altitude change of the aircraft, weather radar data, wind data, data for detecting turbulences, and flight phase-specific times.

2. The monitoring method of claim 1;
    wherein the seat occupancy status and the fastening status are continuously measured such that the monitoring device detects a change of the seat occupancy status and a change of the fastening status.

3. The monitoring method of claim 1;
    wherein the monitoring device is automatically activated at predetermined parameters; and
    wherein the parameters are selected from the group consisting of duration of a seat status, number of non-fastened safety belts and number of vacant booked seat elements.

4. The monitoring method of claim 1, further comprising:
    transmitting the warning signal to a central indicating unit; and
    indicating the warning signal by the central indicating unit.

5. The monitoring method of claim 4, further comprising:
    determining of a position of the seat element in the aircraft; and
    indicating the position of the seat element on the central indicating unit.

6. The monitoring method of claim 1, further comprising:
    transmitting the warning signal to a local indicating unit by the monitoring device;
    indicating the warning signal by the local indicating unit; and
    wherein the local indicating unit is installed within a range of perception of a passenger situated in the seat element.

7. The monitoring method of claim 1, further comprising:
    transmitting the warning signal to a decentralized indicating unit by the monitoring device;
    indicating the warning signal by the decentralized indicating unit; and
    wherein the decentralized indicating unit is assigned to the seat element.

8. The monitoring method of claim 1, further comprising:
    storaging of the seat occupancy status and the fastening status in a storage element.

9. The monitoring method of claim 8,
    wherein passenger data is provided to the storage element; and
    the seat occupancy status and the fastening status are compared with the passenger data.

10. The monitoring method of claim 1,
    wherein the seat occupancy status and the fastening status of a plurality of seat elements are made available to the monitoring unit.

11. The monitoring method of claim 10, further comprising:
    activating of the monitoring device for a predetermined number of a seat elements selected from the plurality of seat elements.

12. The monitoring method of claim 1,
    wherein the warning signals are selected from the group consisting of audio signals, illumination signals, vibration signals, video signals and recorded voice signals.

13. The monitoring method of claim 1,
    wherein at least one of the seat occupancy status, the fastening status and the warning signals is transmitted by wireless transmission.

14. The monitoring method of claim 1,
    wherein the fastening sensor is arranged in a belt lock of the seat element;
    wherein the fastening sensor includes a Hall sensor; and
    wherein the fastening status is measured by the Hall sensor such that the engagement between a belt lock and a belt buckle of the seat element is detected.

15. The monitoring method of claim 14,
    wherein the fastening status is transmitted to the monitoring device by a conductor woven into a belt band; and
    wherein the belt band connects the belt lock and the belt buckle to the seat element.

16. The monitoring method of claim 1,
    wherein the seat occupancy sensor is arranged in a seat cushion of the seat element; and
    wherein a weight of an object situated on the seat cushion is measured such that the seat occupancy status is determined.

17. The monitoring method of claim 1,
    wherein the seat occupancy sensor is arranged in a seat cushion of the seat element; and
    wherein the shape of a seat impression of an object situated on the seat cushion is measured such that the seat occupancy status is determined.

18. A monitoring system for an aircraft for monitoring seat status comprising:
    a monitoring device; and
    a seat element with a seat occupancy sensor and a fastening sensor;

wherein the seat occupancy sensor is operative to measure the seat occupancy status of the seat element;
wherein the fastening sensor is operative to measure the fastening status of the seat element;
wherein the seat occupancy status and the fastening status can be transmitted to the monitoring device;
wherein the monitoring device is operative to automatically generate a warning signal if a combination of a predetermined occupancy status and a predetermined fastening status occurs; and wherein the monitoring device is activated automatically at predetermined flight status data; and
wherein the flight status data is selected from the group consisting of data on an altitude change of the aircraft, weather radar data, wind data, data for detecting turbulences, and flight phase-specific times.

19. An aircraft comprising a monitoring system for monitoring a seat status according to claim 18.

* * * * *